(12) United States Patent
NakaMats

(10) Patent No.: US 12,314,081 B2
(45) Date of Patent: May 27, 2025

(54) SUPER SMARTPHONE

(71) Applicant: Yoshiro NakaMats, Tokyo (JP)

(72) Inventor: Yoshiro NakaMats, Tokyo (JP)

( * ) Notice: Subject to any disclaimer, the term of this patent is extended or adjusted under 35 U.S.C. 154(b) by 0 days.

(21) Appl. No.: 17/026,751

(22) Filed: Sep. 21, 2020

(65) Prior Publication Data

US 2021/0124389 A1    Apr. 29, 2021

Related U.S. Application Data

(60) Provisional application No. 62/973,228, filed on Sep. 24, 2019.

(51) Int. Cl.
*G06F 1/16* (2006.01)
*G02B 30/34* (2020.01)
*H04M 1/02* (2006.01)
*H04M 1/72409* (2021.01)

(52) U.S. Cl.
CPC ........... *G06F 1/1641* (2013.01); *G02B 30/34* (2020.01); *G06F 1/1616* (2013.01); *G06F 1/163* (2013.01); *G06F 1/1681* (2013.01); *G06F 1/1686* (2013.01); *G06F 1/1688* (2013.01); *H04M 1/72409* (2021.01); *G06F 1/162* (2013.01); *G06F 1/1647* (2013.01); *G06F 1/1652* (2013.01); *H04M 1/0268* (2013.01)

(58) Field of Classification Search
CPC .... G06F 1/1605; G06F 1/1615; G06F 1/1616; G06F 1/1618; G06F 1/162; G06F 1/163; G06F 1/1641; G06F 1/1647; G06F 1/1652; G06F 1/1681; G06F 1/1686; G06F 1/1688; H04M 1/72409; H04M 1/0268; G02B 30/34

See application file for complete search history.

(56) References Cited

U.S. PATENT DOCUMENTS

| | | | | |
|---|---|---|---|---|
| D171,480 S | * | 2/1954 | Beck | D16/222 |
| 4,175,828 A | * | 11/1979 | Carver | G02B 30/37 359/474 |
| 5,058,990 A | * | 10/1991 | Bush | G02B 30/37 359/477 |
| D323,180 S | * | 1/1992 | Bush | D16/222 |
| 6,069,735 A | * | 5/2000 | Murphy | G02B 27/04 359/474 |
| 6,267,236 B1 | * | 7/2001 | Seok | A45C 13/002 206/320 |
| 8,836,842 B2 | * | 9/2014 | Sirpal | G06F 1/1677 348/333.05 |
| 9,582,035 B2 | * | 2/2017 | Connor | A61B 5/4875 |
| 9,946,077 B2 | * | 4/2018 | Kong | G02B 27/0179 |
| 10,120,199 B2 | * | 11/2018 | Kong | G02B 30/37 |
| 10,264,186 B2 | * | 4/2019 | Lei | H04M 1/0264 |
| 10,352,354 B1 | * | 7/2019 | Hsu | G06F 1/1652 |
| 10,635,137 B2 | * | 4/2020 | Park | G06F 1/1686 |
| 10,866,618 B2 | * | 12/2020 | Yeom | G06F 1/1626 |
| 11,971,747 B2 | * | 4/2024 | Wu | G04G 17/00 |

(Continued)

FOREIGN PATENT DOCUMENTS

WO    WO-2017065475 A1 *  4/2017 ........... G06F 1/1626

*Primary Examiner* — Nidhi Thaker
(74) *Attorney, Agent, or Firm* — Wenderoth, Lind & Ponack, L.L.P.

(57) ABSTRACT

[Problem] To provide a completely new smartphone.
[Solution Means] A plurality of smartphones are combined.

5 Claims, 27 Drawing Sheets

(56) References Cited

U.S. PATENT DOCUMENTS

| | | | |
|---|---|---|---|
| 2002/0016191 A1* | 2/2002 | Ijas | G06F 1/1641 |
| | | | 455/575.3 |
| 2012/0120618 A1* | 5/2012 | Bohn | G06F 1/1681 |
| | | | 361/749 |
| 2012/0137471 A1* | 6/2012 | Kujala | G06F 1/1681 |
| | | | 16/382 |
| 2012/0218690 A1* | 8/2012 | Okutsu | G06F 1/166 |
| | | | 361/679.01 |
| 2014/0009828 A1* | 1/2014 | Plotkin | G02B 30/34 |
| | | | 359/474 |
| 2014/0218321 A1* | 8/2014 | Lee | G06F 1/1677 |
| | | | 345/173 |
| 2015/0062525 A1* | 3/2015 | Hirakata | G09F 9/301 |
| | | | 349/158 |
| 2015/0103152 A1* | 4/2015 | Qin | G02B 27/0176 |
| | | | 348/53 |
| 2016/0259169 A1* | 9/2016 | Smith | G02B 27/0172 |
| 2017/0139442 A1* | 5/2017 | Yoshizumi | G06F 1/1681 |
| 2018/0059720 A1* | 3/2018 | Sun | G06F 1/1618 |
| 2018/0095504 A1* | 4/2018 | Knepper | G06F 1/1681 |
| 2018/0120901 A1* | 5/2018 | Jin | G06F 1/1677 |
| 2018/0196468 A1* | 7/2018 | Watamura | G06F 1/1641 |
| 2018/0375975 A1* | 12/2018 | Kikuchi | G06F 1/1681 |
| 2019/0067386 A1* | 2/2019 | Chun | G06F 1/1641 |
| 2019/0394890 A1* | 12/2019 | Cromer | E05D 7/00 |
| 2020/0218312 A1* | 7/2020 | Connor | G06F 1/1649 |

* cited by examiner

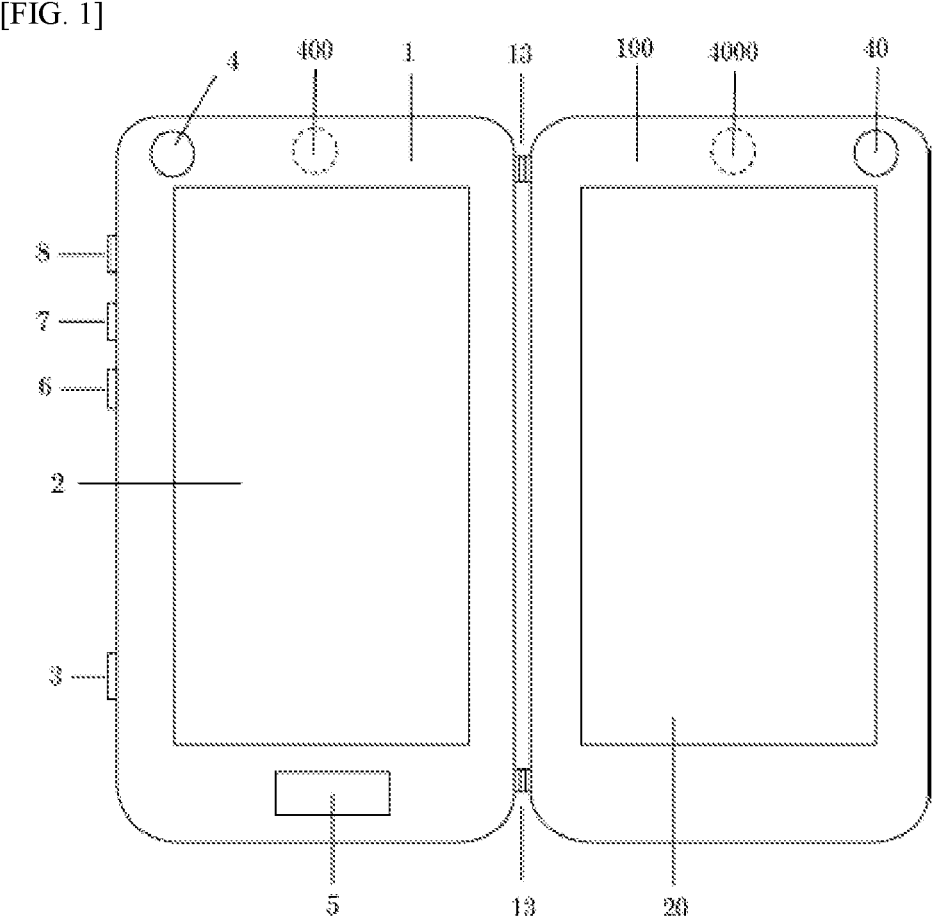
[FIG. 1]

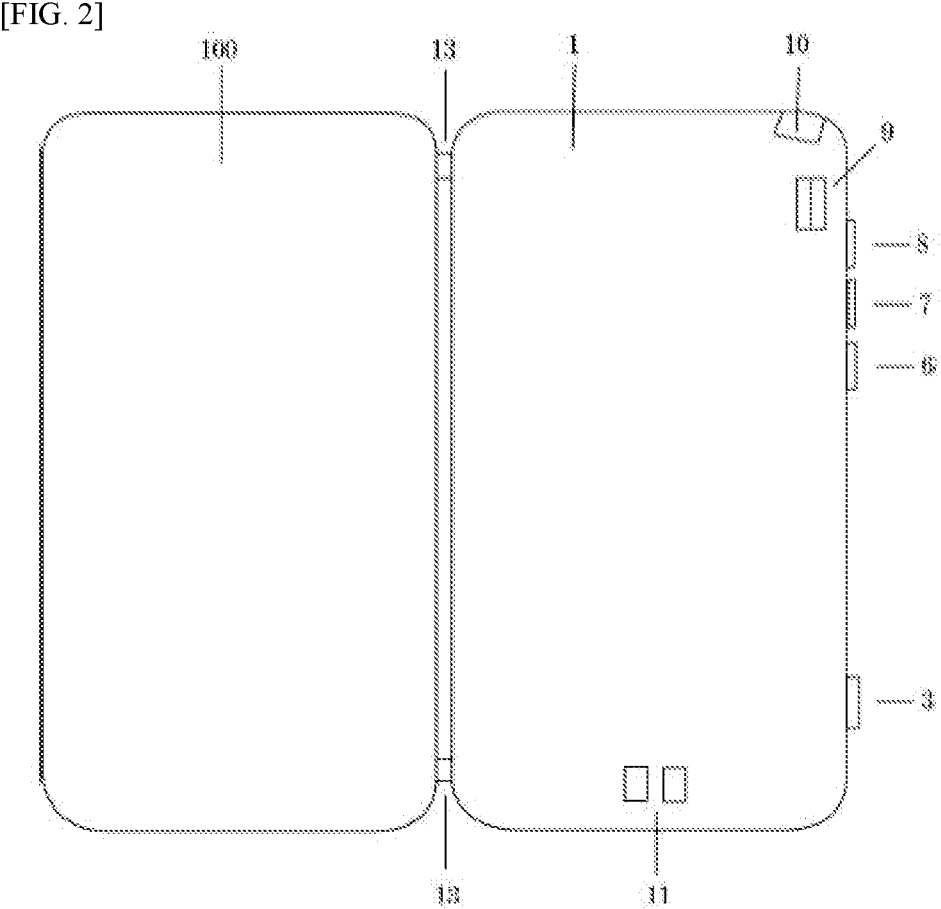
[FIG. 2]

[FIG. 3]
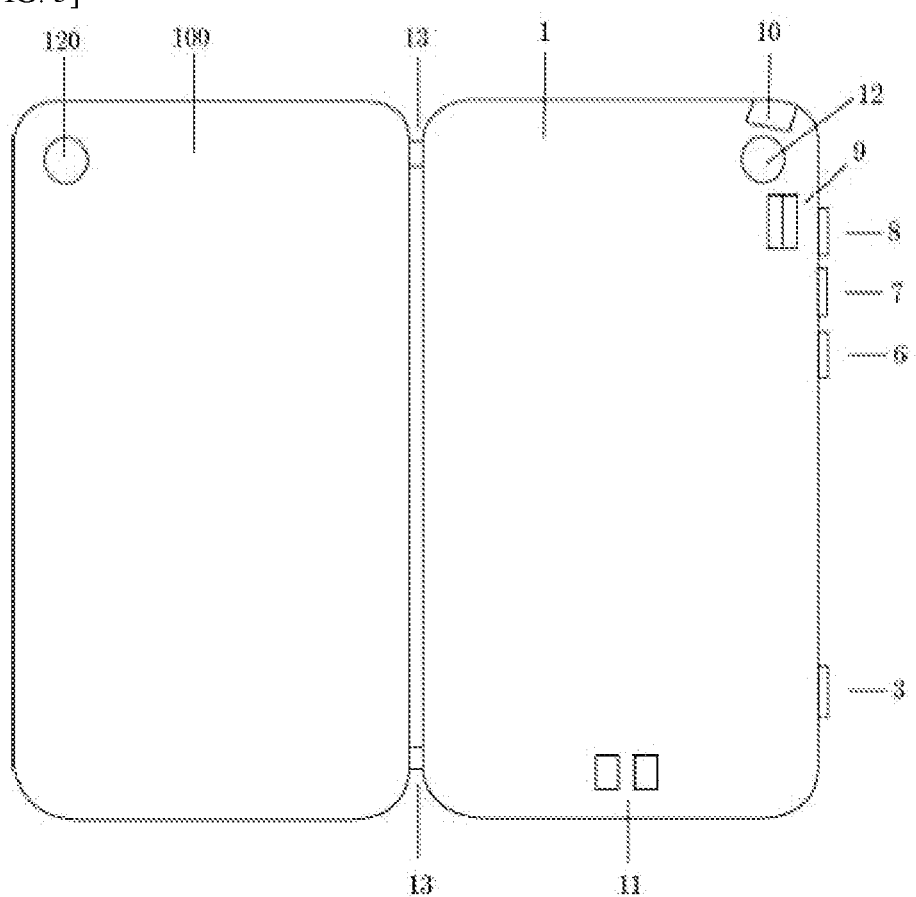

[FIG. 4]
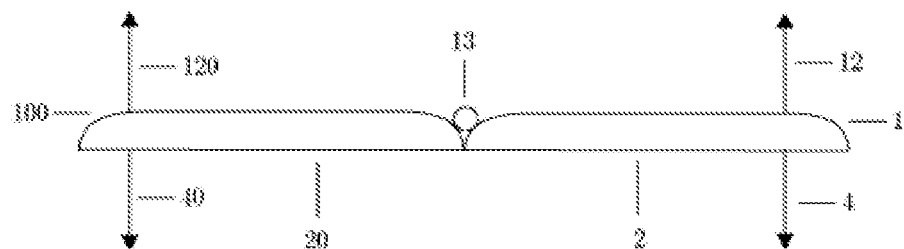

[FIG. 5]
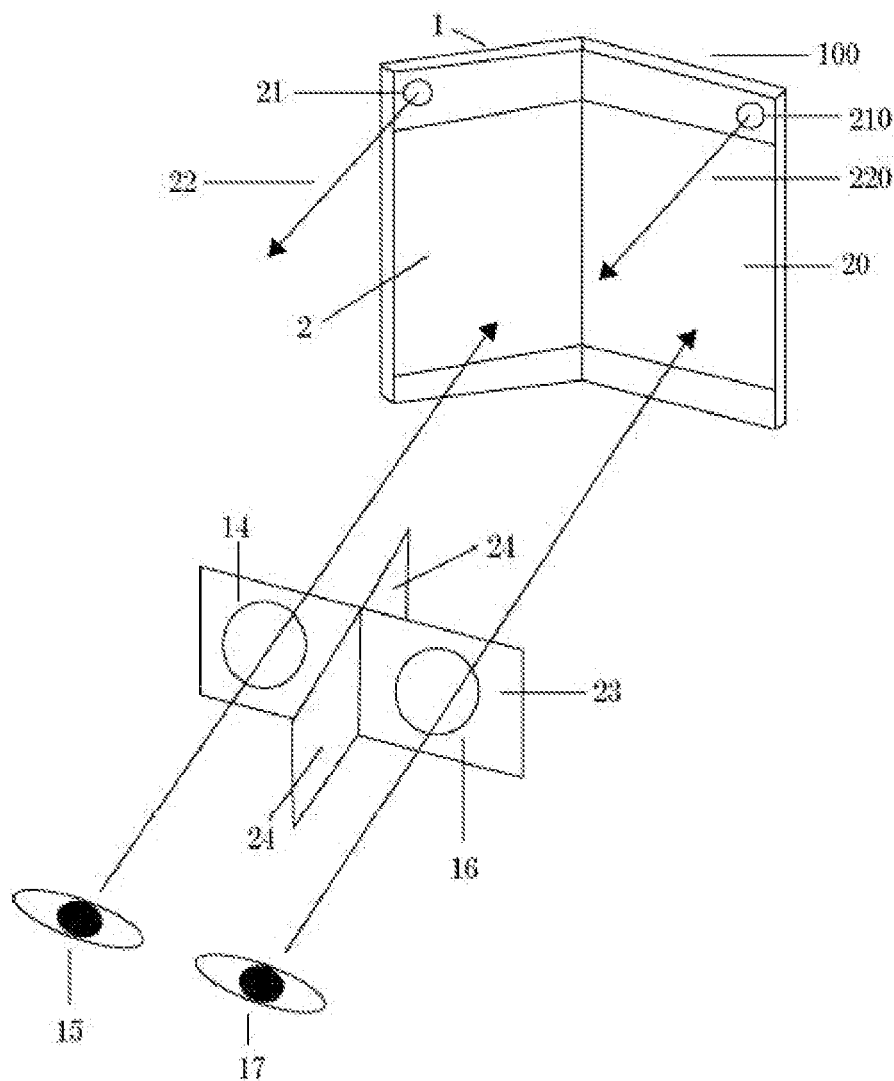

[FIG. 6]
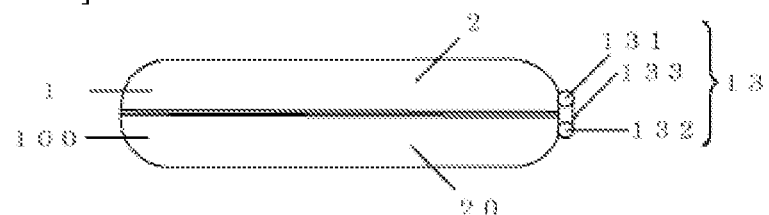
[FIG. 7]
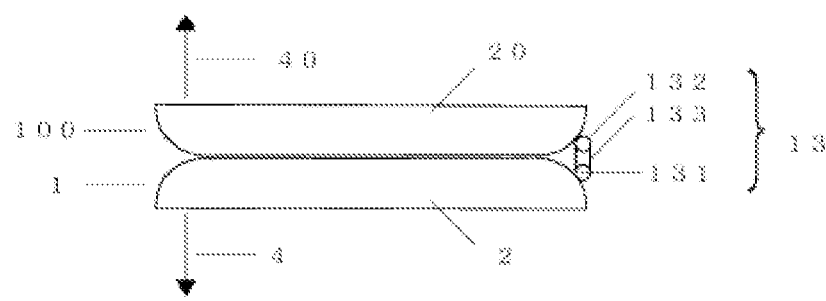

[FIG. 8]
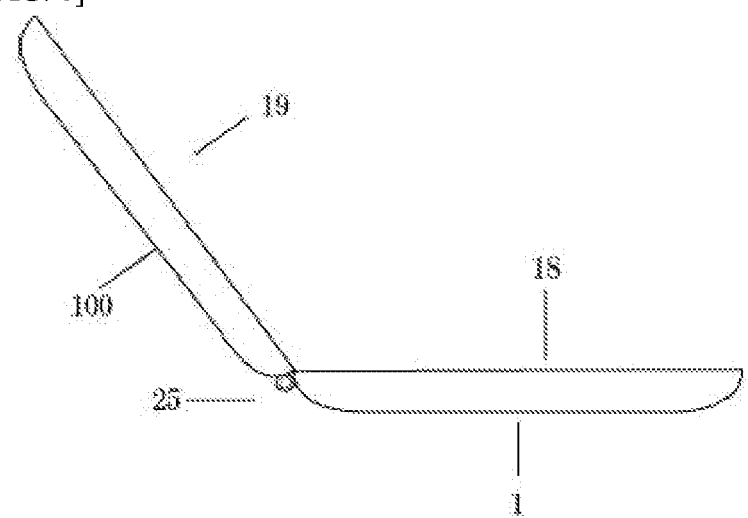

[FIG. 9]
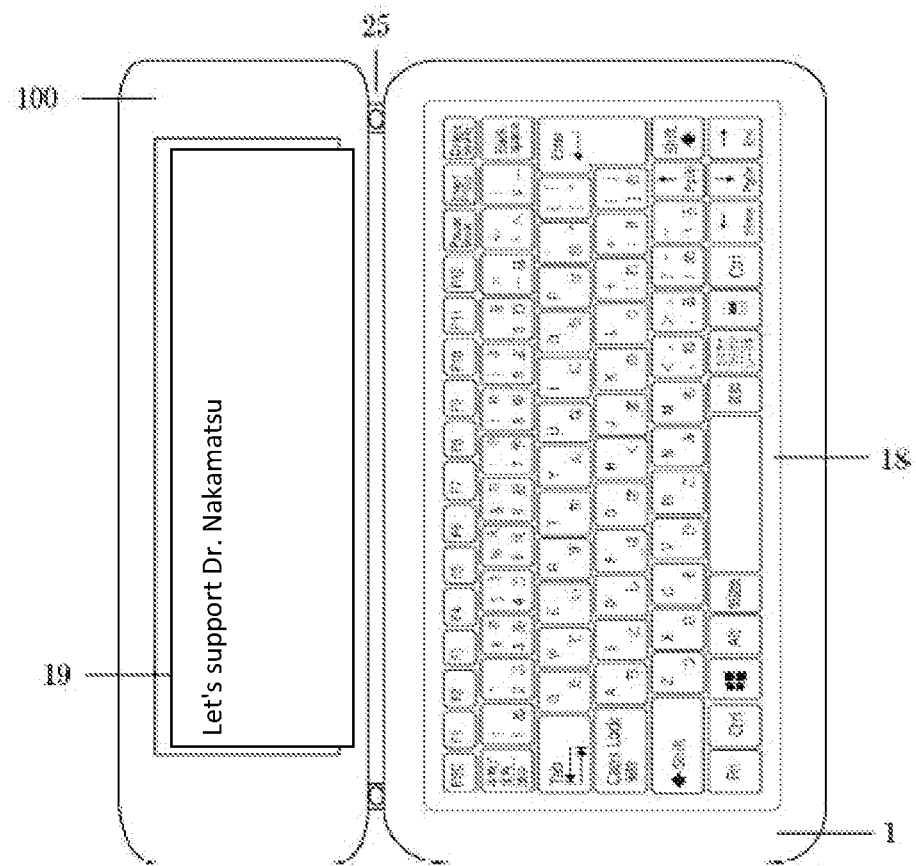
{FIG. 10}
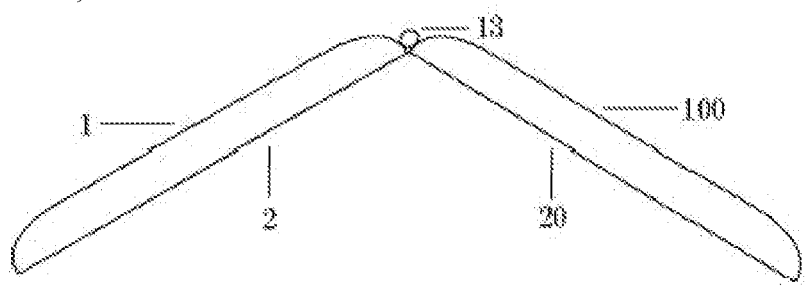

[FIG. 11]
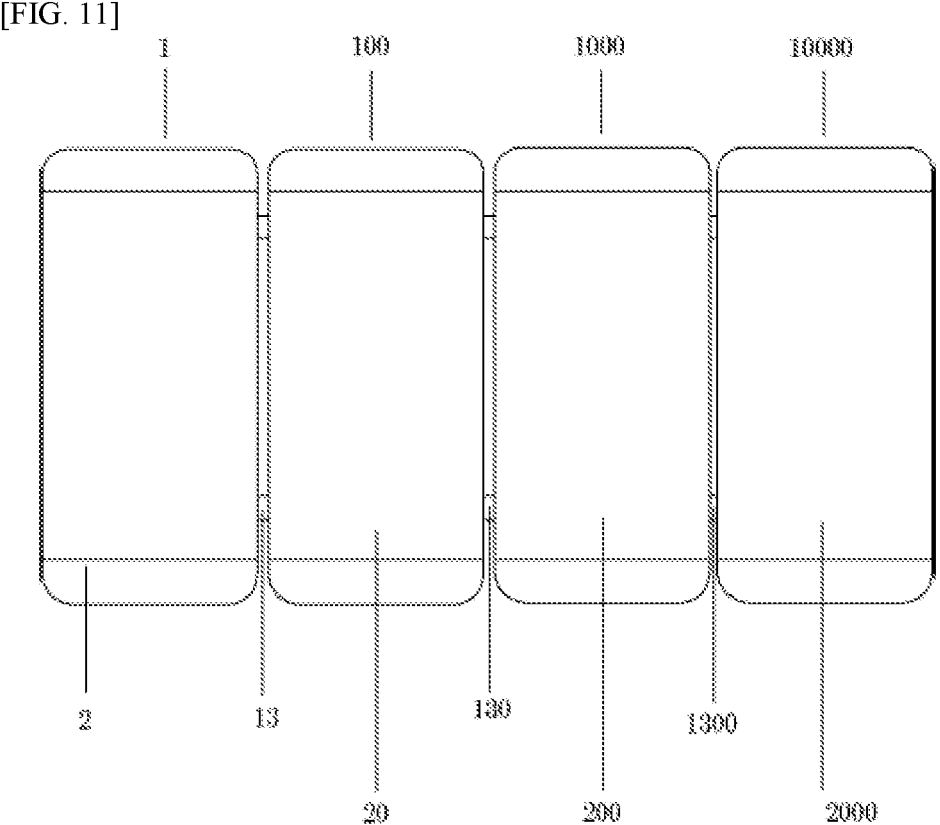

[FIG. 12]
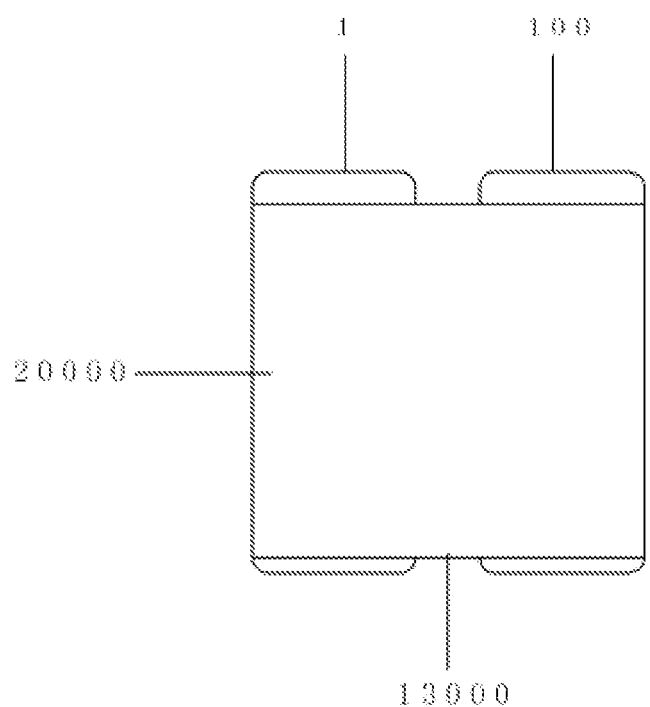

[FIG. 13]
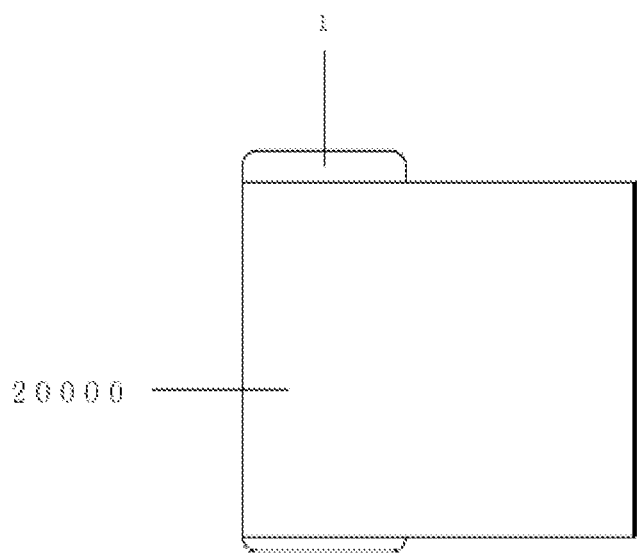

[FIG. 14]
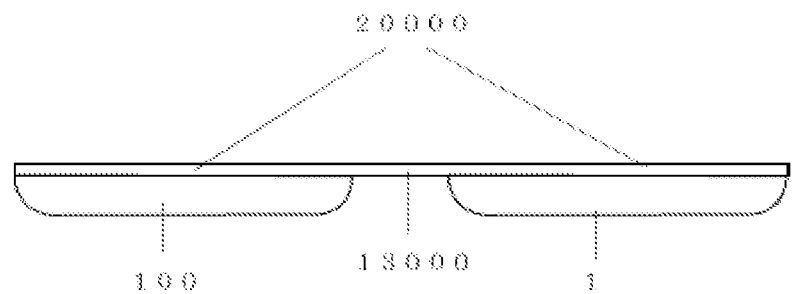
[FIG. 15]
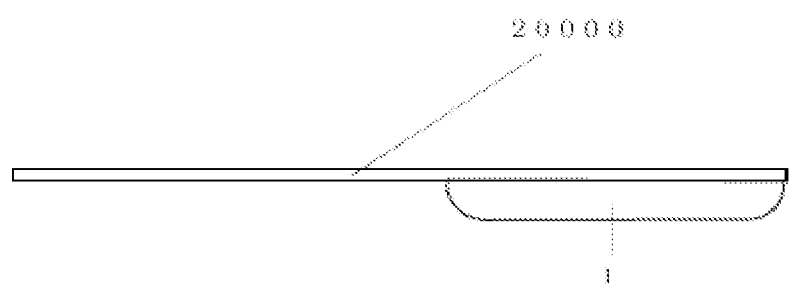

[FIG. 16]
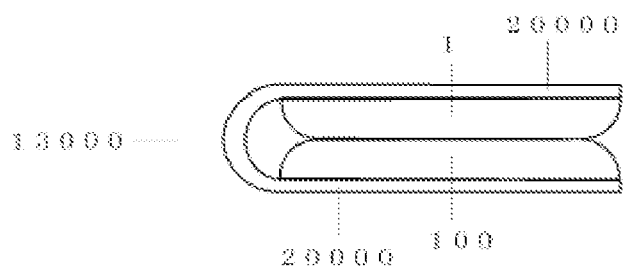
[FIG. 17]
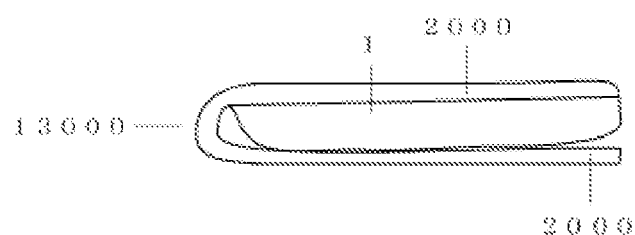

[FIG. 18]
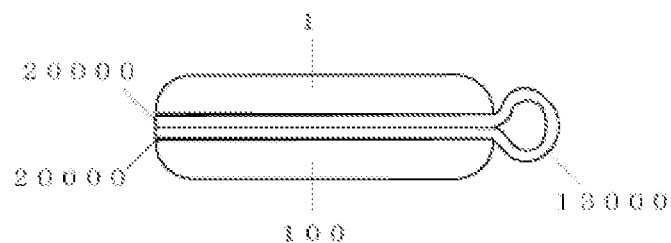
[FIG. 19]
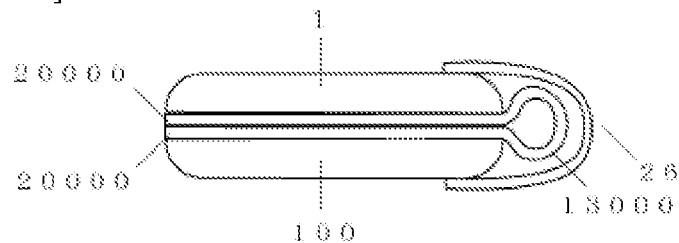

[FIG. 20]
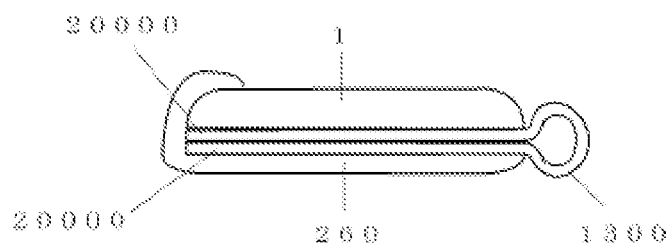
[FIG. 21]
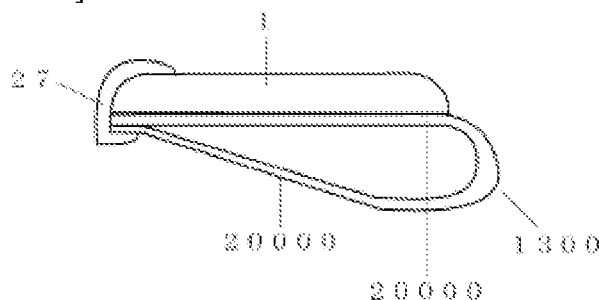

[FIG. 22]
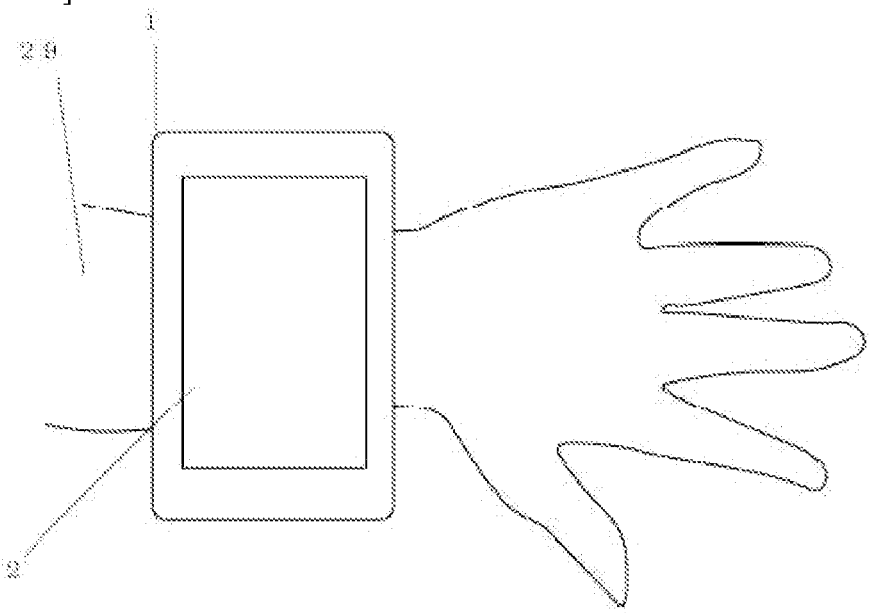
[FIG. 23]
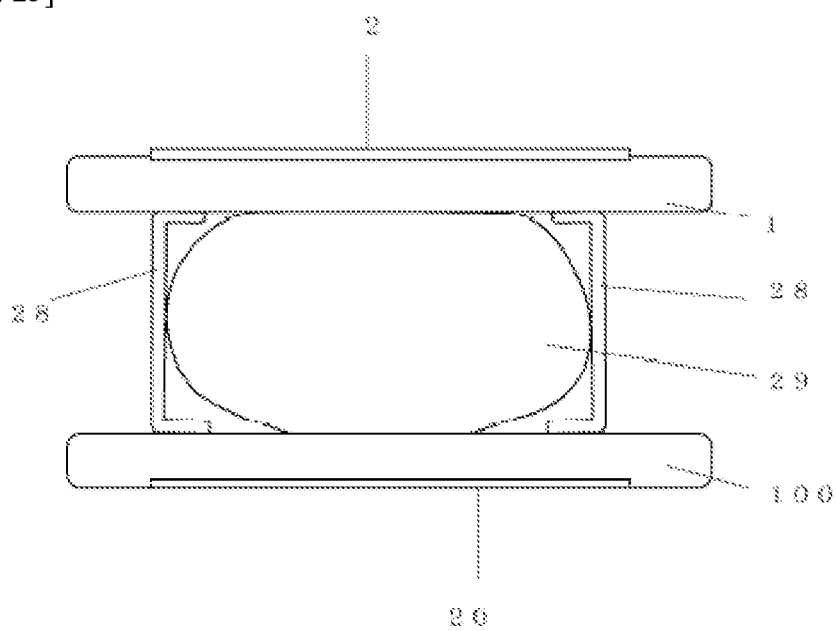

[FIG. 24]
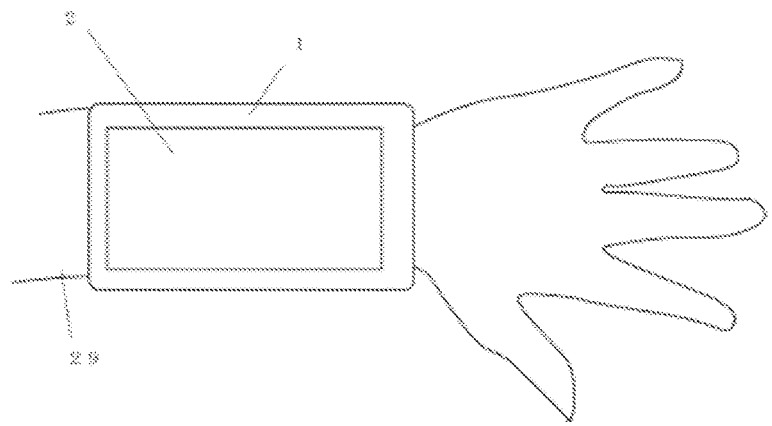
[FIG. 25]
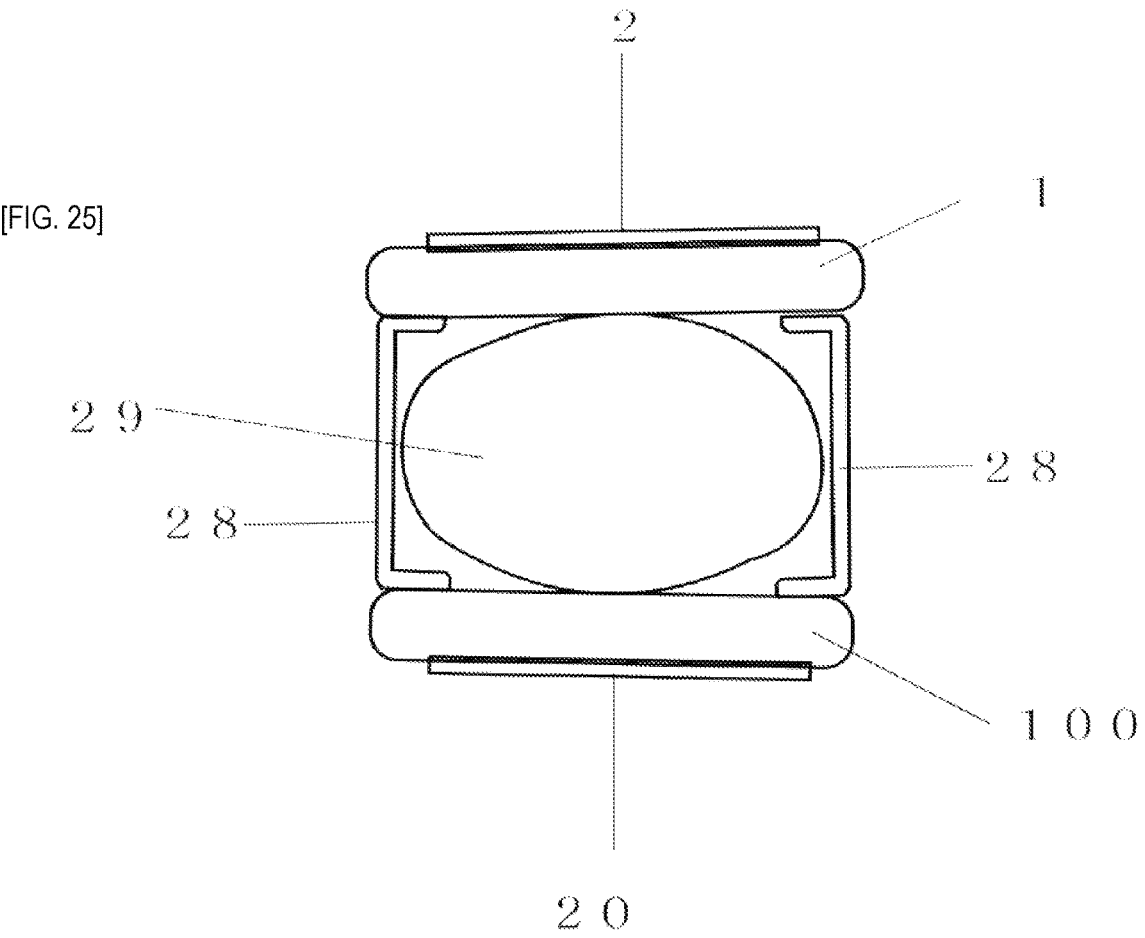

[FIG. 26]
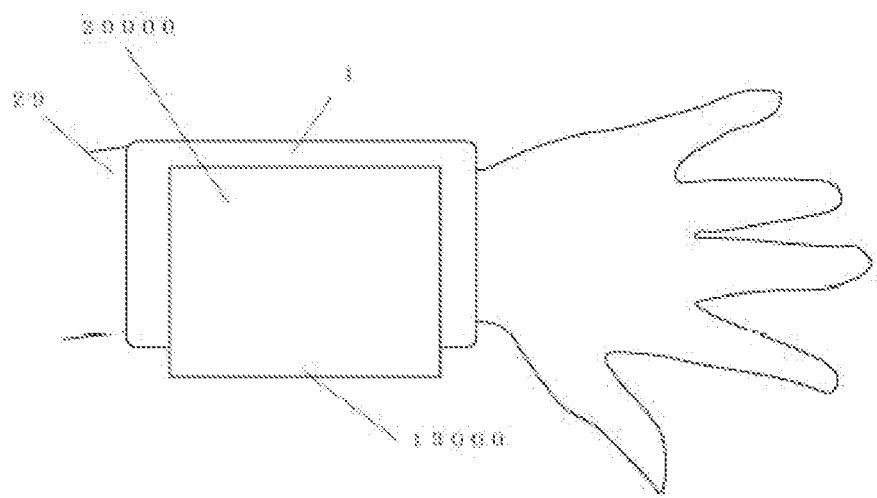
[FIG. 27]
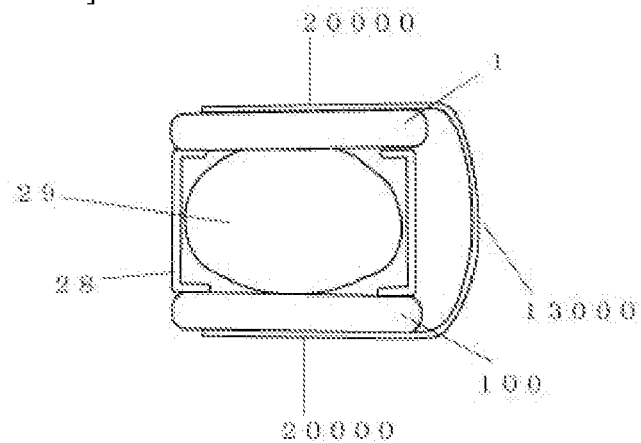

[FIG. 28]
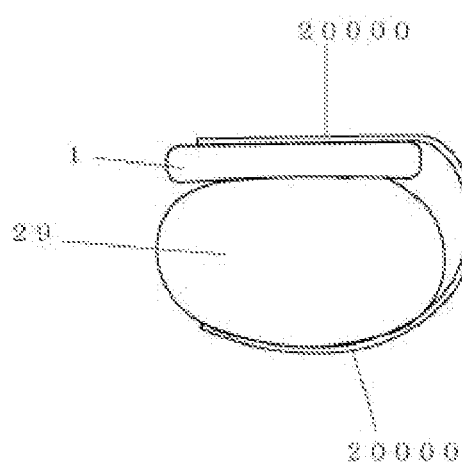

[FIG. 29]
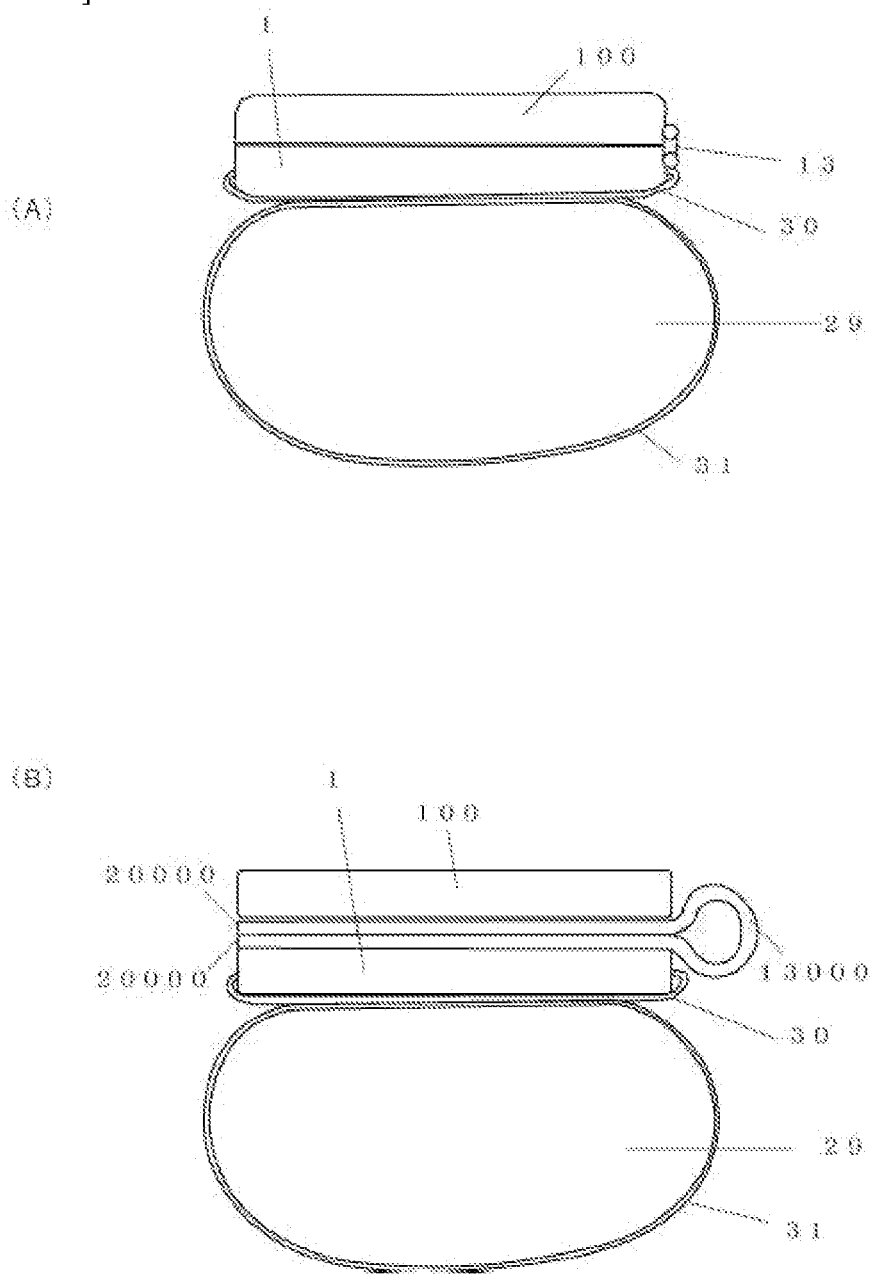

[FIG. 30]
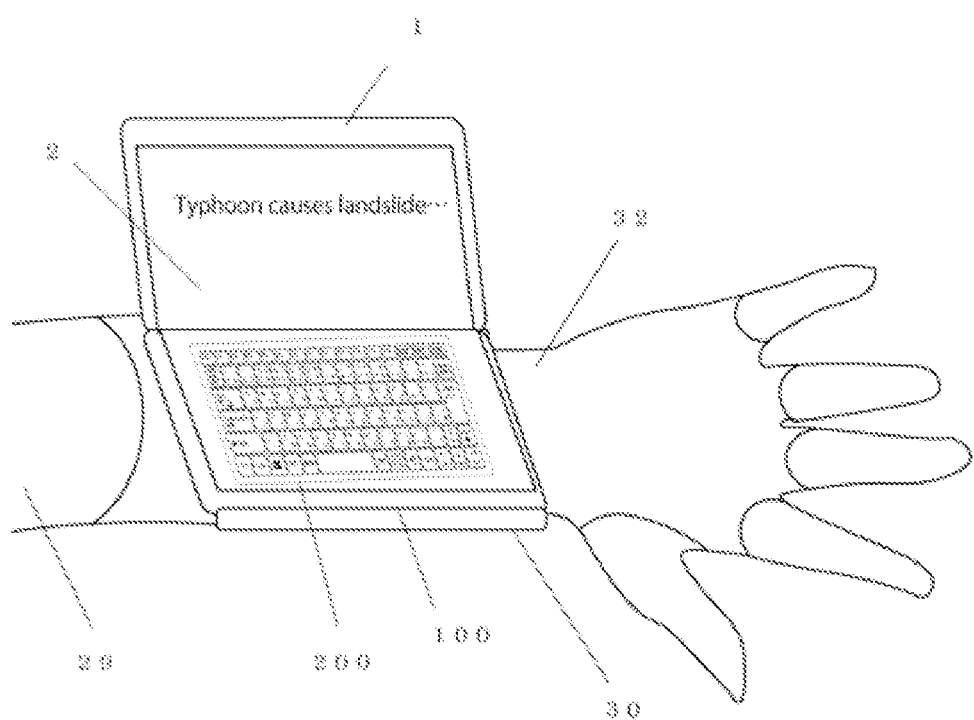

[FIG. 31]
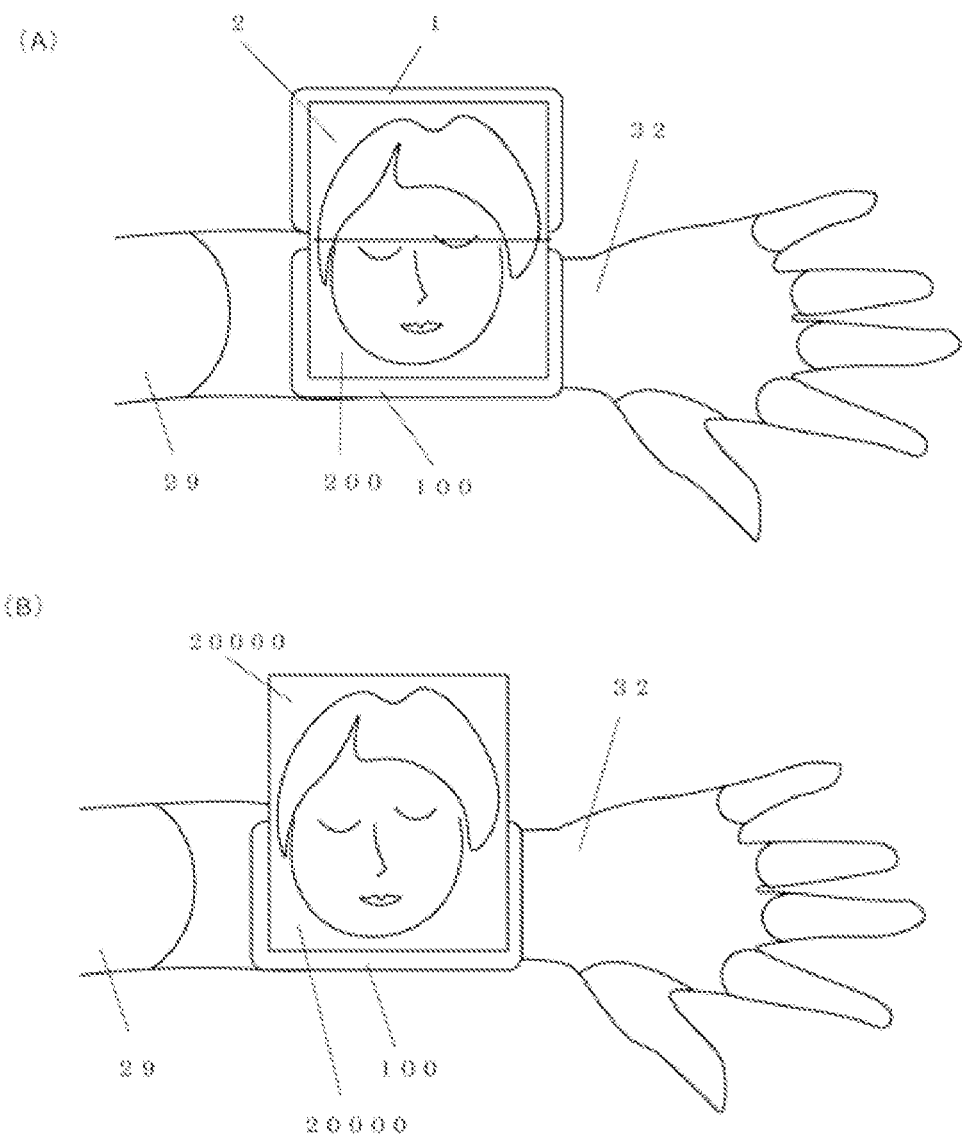

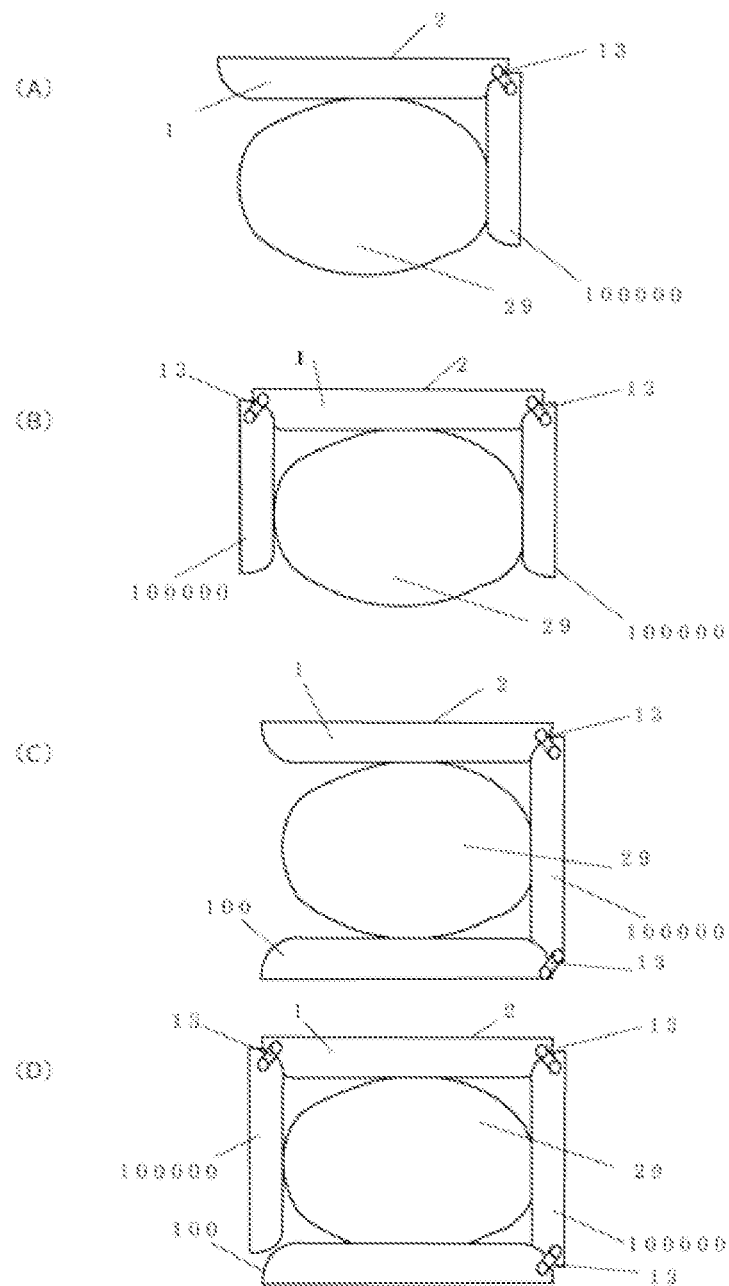
[FIG. 32]

[FIG. 33]
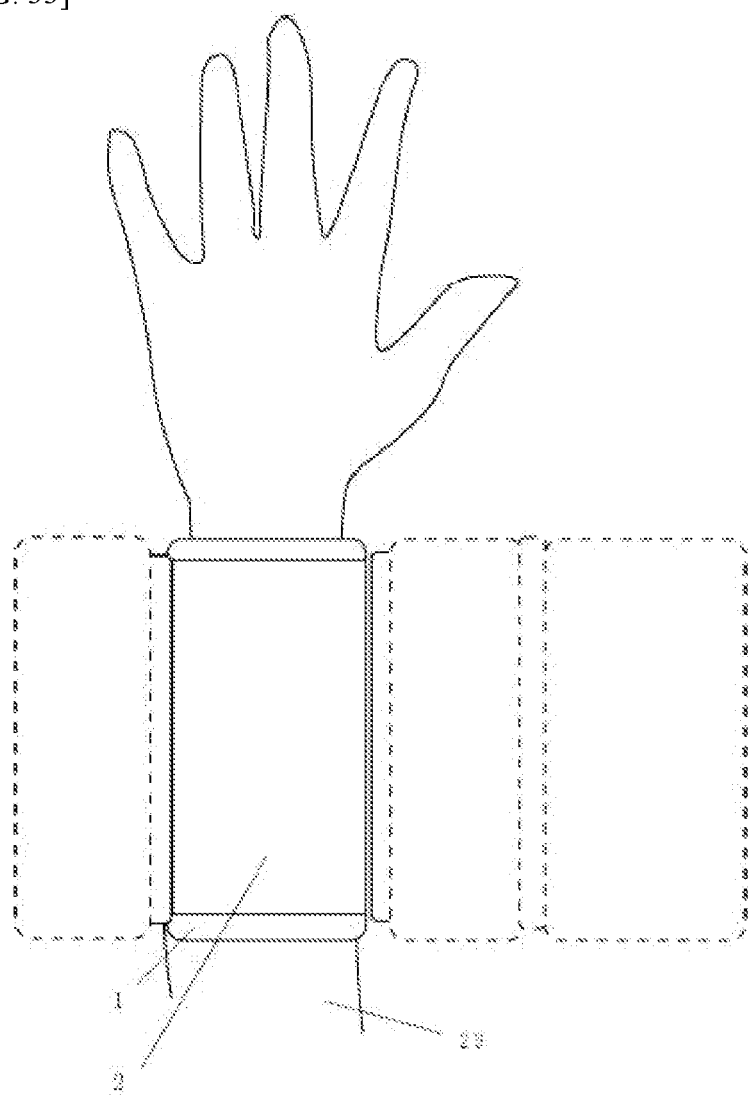

[FIG. 34]
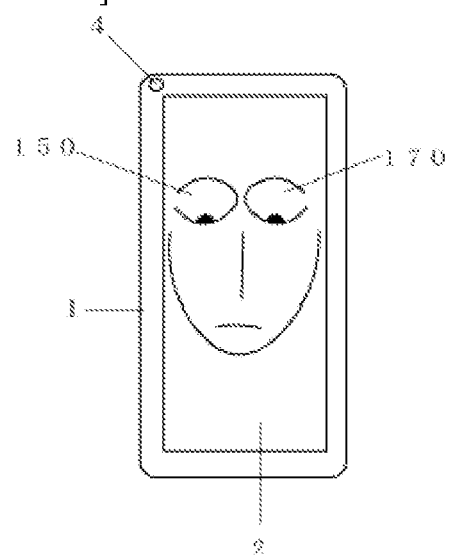

[FIG. 35]
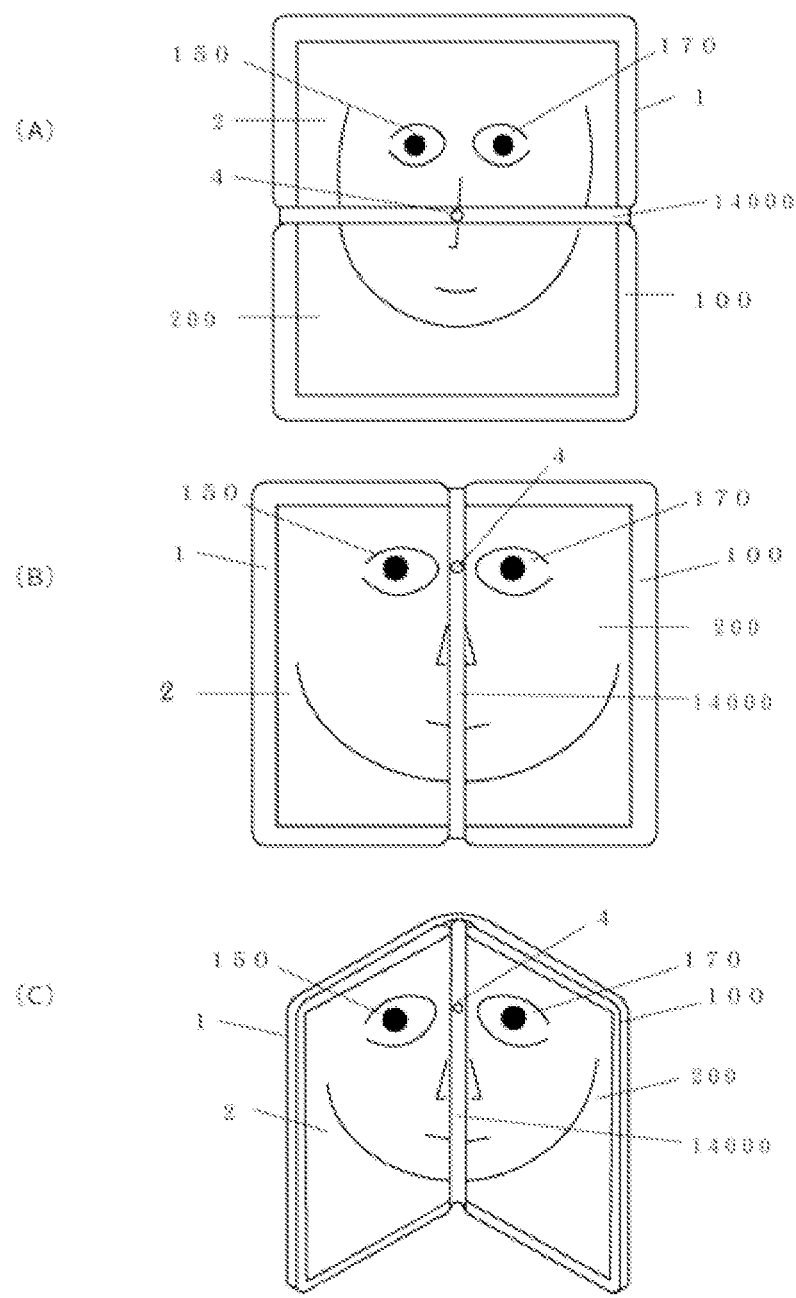

[FIG. 36]
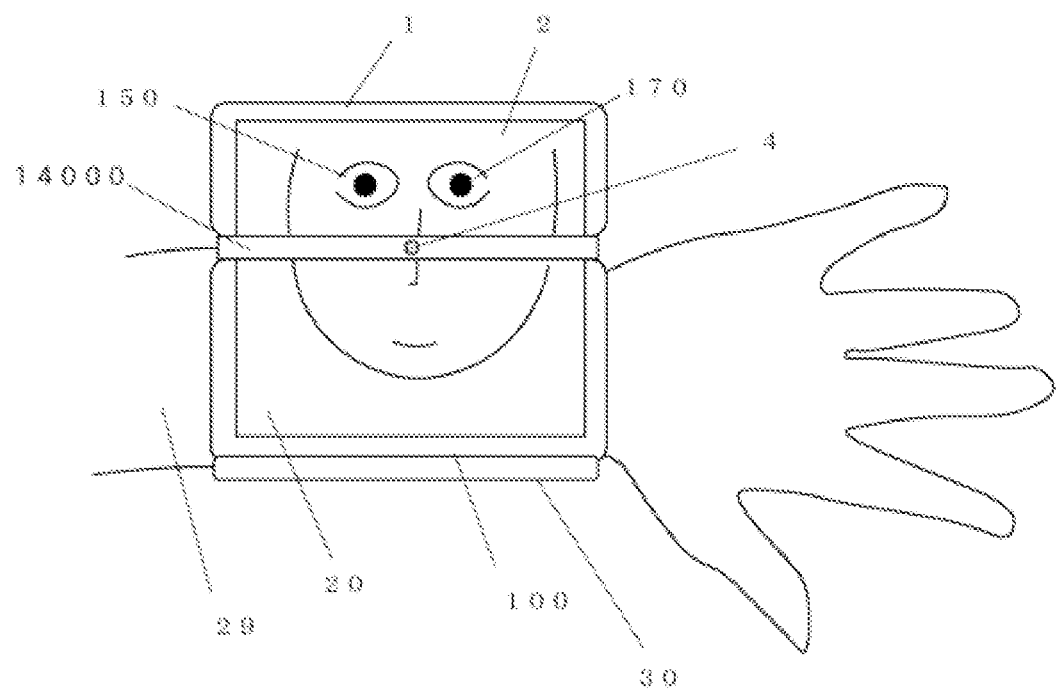

SUPER SMARTPHONE

TECHNICAL FIELD

Smartphone

BACKGROUND ART

As the top article on the first page of the evening edition of the Nihon Keizai Shimbun on Feb. 26, 2018 states, "Smartphone evolution corner" and "Samsung function, lack of newness," the evolution of smartphones has stopped.

SUMMARY OF THE INVENTION

Problems to be Solved by the Invention

As mentioned above, the evolution of the smartphone has stopped, so we invented a smartphone with completely new functions.

Means for Solving the Problems

A plurality of smartphones are connected to increase functions from various angles.

Effects of the Invention

According to the present invention, to obtain a big screen wherein, although the outer shape is compact, the screen is n times larger than the body, and there are no seams on the screen. A smartphone wherein it is possible to combine a plurality of smartphones without using hinges, the screen can be protected without the need for a case, since it is possible to prevent the image from being touched, malfunctions will not occur, since the front and back of the smartphone can be displayed on the screen, the person on the other side of the conversation can see the screen at the same time, it is possible to shoot from the front and back at the same time, it is possible to take 360° photos instantly, the keyboard and information can be displayed on separate screens, despite the smartphone being small, it is possible to input while looking at the big keyboard and big screen, the image can be self-supporting, it is possible to see it, it is possible to obtain 3D image and stereo sound, such features can be expanded n times, and it is possible to form a screen that can rotate the smartphone screen 360 degrees around the hinge.

BRIEF DESCRIPTION OF THE DRAWINGS

FIG. 1 is a front view of Working Examples 1 and 2 of the present invention.

FIG. 2 is a rear-view development view of Working Example 3 of the present invention.

FIG. 3 is a rear-view development view of Working Example 4 of the present invention.

FIG. 4 is a top view of a development view of Working Example 5 of the present invention.

FIG. 5 is an explanatory view of stereoscopic sound of a stereoscopic image according to Working Example 6 of the present invention.

FIG. 6 is a top surface view of Working Example 7 of the present invention closed inward.

FIG. 7 is a top surface view of Working Example 8 of the present invention closed to the outside and used by a plurality of people from both sides.

FIG. 8 is a side view of using a keyboard and a screen like the typewriter of the Working Example 9 of the present invention.

FIG. 9 is a top view of the same as above.

FIG. 10 is a top view of a door-shaped screen of working example 10 of the present invention placed on a desk.

FIG. 11 is a plan view in which n units of working example 11 of the present invention are connected.

FIG. 12 is a screen development view of working example 12 of the present invention.

FIG. 13 is a screen development view of working example 13 of the present invention.

FIG. 14 is a top view of Working Example 12 of the present invention.

FIG. 15 is a top view of Working Example 13 of the present invention.

FIG. 16 is a top view of the screen of Working Example 12 of the present invention wound outward.

FIG. 17 is a top view of the screen of Working Example 13 of the present invention wound outward.

FIG. 18 is a top view for explaining that the screen is folded inward and also serves as a hinge in Working Example 14 of the present invention.

FIG. 19 is Working Example 15 of the present invention in which FIG. 18 is covered with a protective cap.

FIG. 20 is Working Example 16 of the present invention in which the screen of FIG. 13 is bent inward and covered with a protective cap.

FIG. 21 is Working Example 17 of the present invention in which the screen of FIG. 13 is loosely bent and covered with a cap.

FIG. 22 is a top view of the present invention in which a two-sided smartphone is worn at a right angle to an arm in Working Example 18 of the present invention.

FIG. 23 is a cross-sectional view of an arm according to Working Example 18 of the present invention.

FIG. 24 is a top view of the present invention in which a smartphone is vertically attached to an arm in Working Example 19 of the present invention.

FIG. 25 is a cross-sectional view of an arm according to a Working Example 19 of the present invention.

FIG. 26 is a top view of attaching two organic EL smartphones to an arm in Working Example 20 of the present invention.

FIG. 27 is a cross-sectional view of an arm according to Working Example 20 of the present invention.

FIG. 28 is a cross-sectional view of the present invention in which a smartphone having an extended organic EL screen in Working Example 21 of the present invention is attached to an arm.

FIG. 29 is a cross-sectional view of the present invention in which a folding smartphone is attached to an arm according to Working Example 22 of the present invention. (A) is an LCD, and (B) is an extended organic EL.

FIG. 30 is a top view of the present invention in which a folding smartphone is attached to a fingerless glove in Working Example 23 of the present invention, the folding smartphone is attached to an arm, and characters are input.

FIG. 31 is a top view of the present invention in which a continuous large image can be seen in the present invention of FIG. 30 in Working Example 24 of the present invention. (A) is an LCD and (B) is an organic EL.

FIG. 32 is a cross-sectional view of an arm when the folding smartphone of the present invention is attached to the arm in Working Example 25 of the present invention. (A) has 2 faces, (B) has 3 faces, (C) has 3 other faces, and (D) has 4 faces.

FIG. 33 is a top view of the folding smartphone of the present invention attached to an arm and expanded laterally to form a large screen according to Working Example 25 of the present invention.

FIG. 34 is an explanatory view in which one's face is visible to the other party on a known smartphone.

FIG. 35 is a view in which the eyes of the smartphone of the present invention look straight ahead in the 26th Working Example of the present invention. (A) is the present invention in which the camera is vertically opened and the camera is arranged in the center, (B) is the present invention in which the camera is opened horizontally and the camera is located above the center, and (C) is the present invention opened in a book shape and standing on a table.

FIG. 36 is a top view of the present invention in which a camera is attached to an arm with a smartphone provided in a folded portion according to Working Example 27 of the present invention.

FORM FOR CARRYING OUT THE INVENTION

FIG. 1 shows a smartphone body 1 and another smartphone body 100 connected by a hinge 13 in Working Example 1 and 2 of the present invention. The provision of cameras 400 and 4000 in the upper center constitutes Working Example 1 of the present invention, and provision thereof in the left and right ends 4 and 40 constitutes the second embodiment of the present invention. FIG. 1 is an enlarged plan view of the bodies 1 and 100 of the present invention. 2 is a smartphone screen, 3 is a camera shutter button, 5 is a home button, 6 is a power button, 7 is a volume down button, and 8 is a volume up button. Further, the hinge 13 not only physically connects the body 1 and the body 100, but also electrically connects the body 1 and the body 100 (not shown).

FIG. 2 is a plan view of the bodies 1 and 100 as viewed from the back in the third embodiment of the present invention, and the camera is not provided on the back side. FIG. 11 is a charging contact, 10 is an antenna, and 9 is a buzzer switch.

FIG. 3 is Working Example 4 of the present invention in which the bodies 1 and 100 are expanded and viewed from the back, and cameras and microphones 12 and 120 are provided at the left and right ends of the bodies 1 and 100, respectively.

FIG. 4 is an expanded view of the Working Example of the present invention shown in FIGS. 1 and 3. Instead of using all four cameras 4, 40, 12, 120, only 4 and 40, or only 12 and 120 can be used, or shooting is possible with any combination thereof. This is Working Example 5 in which large images with all cameras connected, 360-degree images, one-sided camera images, large self-portrait images, front and back simultaneous images and face-to-face simultaneous image and the like, ground surface and sky simultaneous images and the like, and images that cannot be captured by a conventional smartphone, can be captured and projected on screens 2 and 20.

FIG. 5 shows Working Example 6 of the present invention in which a speaker 21 is provided at the left end of the body 1 and a speaker 210 is provided at the right end of the body 100. In this Working Example, the vertical outer frame of screens 2 and 200 is eliminated and the left and right screens are folded into a V shape at the last moment to make a large screen in which contact lines cannot be seen; by folding it into a V shape, it can stand on its own, it becomes a powerful large image with screen 2 and screen 20 continuing, and it can be enjoyed with a large 2+20 screen and stereo sound from the left and right speakers 21 and 210.

By shooting and recording the left and right separate images and audio with the camera and microphones 12 and 120 shown in FIG. 4, the left and right separate images appear on the screens 2 and 20; as shown in FIG. 5, a three-dimensional device 23 provided with a separator 24 and left and right lenses 14 and 16 is placed in front of both eyes 15 and 17, and when the smartphone screens 2 and 20 are viewed, the image appears three-dimensional and the speaker 21, 210 sounds 22 and 220 can be heard three-dimensionally.

FIG. 6 shows Working Example 6 in which the screen 2 and the screen 20 of the smartphone of the present invention are folded facing inward; by doing so, the present invention is capable of protecting the screen, and since it cannot be touched on both sides, it has an effect of preventing malfunction, and in Working Example 7, it has an effect of preventing the unauthorized use of the smartphone.

FIG. 7 shows Working Example 8 in which the screen 2 and the screen 20 are folded outward and the screens are on the front and back of the body, contrary to the case of FIG. 6; as a result, the camera 4 takes a picture of itself 21 and the camera 40 captures a picture of the other party 22, and each face is captured on the screen 20 and the screen 2 at the same time. If there is no other party 22, the smartphone of the present invention makes it possible to take pictures of the scenery in front of and behind oneself at the same time, or to place the smartphone of the present invention horizontally so that the ground surface and the sky are simultaneously captured and displayed on both sides, things that have not been possible with known smartphones.

There are four types of hinges with the present invention. The first has two hinges 131 and 132 as shown in FIGS. 6 and 7, and is rotated by an arm 133 connecting these hinges 131 and 132; the hinge 13 is capable of rotating 180 degrees outward (that is, rotating 360 degrees) from the state in which the screen 2 and the drawing 20 are folded facing inward in FIG. 6. Specifically, the hinge 13 has two rotation axes, the body 1 is joined so as to rotate around the rotation axis of the hinge 131, and the body 100 is joined so as to rotate around the rotation axis of the hinge 132. Further, the two rotating shafts are connected by a long arm 133, which is rigidly or flexibly supported and joined. With this hinge, the screens can be in close contact with each other when the screens 2 and 20 are facing inward, and the backs can be in close contact with each other when the screens 2 and 20 are facing outward; therefore, it is easy to operate and does not take up space. Further, as shown in FIGS. 4 and 5, the second hinge of the present invention is characterized in that it is provided on an inclined portion of the door of the smartphone. It is a hinge that can integrate both screens without a gap between the screens 2 and 20 when the body 1 and the body 100 are opened in a straight line or a fan shape. With the hinge 13, the connected screens 2 and 20 can be seamlessly integrated to form a large screen. The third hinge of the present invention is a hinge having a mechanism capable of stopping at an arbitrary angle as shown in FIGS. 8 and 9.

The fourth hinge 13000 of the present invention is made of a flexible material, for example, an organic EL hinge; this will be described with reference to FIGS. 12 to 20, but the screens 2 and 20 can be made of a thin film of organic electroluminescent (organic EL) 20000. Since it can be folded, the parts corresponding to the screens 2 and 20 are integrated with one organic EL film without any gaps in the screen to form a large screen. In addition, since it can also be used as a hinge, a hinge is not required. This will be described in detail in FIG. 12 and later.

FIGS. 8 and 9 show Working Example 9 of the present invention, wherein as described above, the hinge 25 connecting the body 1 and the body 100 is provided with a hinge 25 capable of stopping the angle formed by the body 1 and the body 100 at an arbitrary angle. The hinge 25 is, of course, electrically connected to the body 1 and the body 100. FIG. 8 is a side view in which the smartphone body 1 of the present invention is placed horizontally on a desk and the angle of the body 100 is set so that the screen 19 can be easily seen; FIG. 9 is a top view thereof, and for example, the support portion 3006 of FIG. 30 in the Qualcomm patent (Japan Patent Application Publication No. 2012-502373) becomes unnecessary. Since the present invention has such a structure, a full keyboard can be displayed on the screen 18 of the body 1, and as a result, the launched characters and images can be viewed on the full screen 19, so small screens such as known smartphones can be used with the keyboard, so that the present invention is able to resolve dissatisfactions such as the keyboard being small and difficult to operate, and the launched screen being small.

FIG. 10 is a view from the top of a state in which the body 1 and the body 100 are opened in a fan shape by the third hinge of the present invention and are caused to stand on the floor, in Working Example 10 of the present invention. Since the screen is fan-shaped, it becomes a pseudo three-dimensional image. According to the present invention, when fan-shaped in this way, the smartphone becomes self-supporting, so that it is not necessary to hold it by hand, and the smartphone can be used on a desk, on a large screen, and with stereo sound.

FIG. 11 shows Working Example 11 of the present invention in which the body 1, the body 100, the body 1000, and the body 10000 are connected by hinges 13, 130, and 1300; however, this is an example in which not only the four pieces shown in the figure but also any n pieces are connected. Therefore, the screen can also be made huge as 2+20+200+2000+n. In addition, if the ends are connected to form a ring shape, it is possible to do things that cannot be done with conventional smartphones that form a 360° screen around the viewer.

FIGS. 12 to 21 show another working example of the present invention, having features wherein it is composed of a light emitting member using an organic electroluminescence phenomenon in which the screen of a smartphone is flexible, a so-called organic EL, and has a sufficiently long bent portion 13000. If this part is absent or short, the organic EL will crack. FIG. 12 is a view of Working Example 12 of the present invention and the like, in which the screen of the smartphone is expanded and viewed from the front. By connecting the body 1 and the body 100 with one organic EL screen 20000 and covering the whole body to make a large screen, a seamless image can be enjoyed.

FIG. 13 shows Working Example 13 of the present invention and is a front view. As shown in FIG. 12, the body 1 and the body 100 are not used, and as shown in FIG. 13, the body 1 is solely composed of only a large organic EL image. As a result, one side of the screen having the thickness of the body can be made very thin, so that it becomes thin when folded and is easy to handle by hand. Moreover, it is possible to enjoy seamless images on a large screen.

FIG. 14 is a view of FIG. 12 as viewed from above. There is no hinge between the body 1 and the body 100, and the body is connected by the organic EL screen 20000. The electrical wiring between the bodies is also arranged in the organic EL screen.

FIG. 15 is a view of FIG. 13 as viewed from above.

FIG. 16 is a view of FIG. 14 viewed from above with the organic EL screen 20000 wrapped outward. The organic EL image 20000 surrounds the outer circumferences of the bodies 1 and 100. The organic EL screen 13000 at the bendable portion is formed to be curved so as not to break.

FIG. 17 is a view from above of FIG. 15 of Working Example 13 of the present invention in a state in which the organic EL screen 20000 is wrapped outward and made compact. The curvature of the organic EL screen 20000 is set so that it will not break even if it is repeatedly bent. The 13000 organic EL serves as a hinge and screen.

FIG. 18 shows the screen 2000 folded inward in Working Example 14 of the present invention. The organic EL screen 20000 is sandwiched between the bodies 1,100. Although the organic EL screen can be folded, the hinge portion 13000 is provided with sufficient slack so that each portion has an angle of 90 degrees or more so that the organic EL screen 13000 of the bent portion is not damaged by sudden bending.

FIG. 19 is Working Example 15 of the present invention provided with a protective cap 26 that covers the organic EL screen 13000 in a bent portion protruding from the bodies 1 and 100 in FIG. 18.

FIG. 20 is a top view of the screen 2000 folded inward in Working Example 16 of the present invention. With the protective cap 260 inserted, the organic EL screen 20000 is folded snugly on the body 1. Although the organic EL screen can be bent, the organic EL screen 13000, which corresponds to the hinge portion, should not be bent at a sharp angle.

FIG. 21 is a view from above of a state in which the screen is gently bent inward in Working Example 17 of the present invention. The organic EL screen 20000 is a knob cap 27 that sandwiches only the edge of the gently bent organic EL screen 20000. In this state, the load due to bending on the organic EL screen 20000 is further reduced, and failure due to bending resulting from repeated use is less likely to occur. The screen is on the back side so it is protected. From the above, a large screen can be formed with a single organic EL film, and when folded, it can also be used as a hinge to form an integrated large screen; moreover, it is an epoch-making invention of a simple and easy-to-use smartphone that does not damage the organic EL even if it is used repeatedly, is easy to operate with a large screen and miniaturization, and does not take up storage space because it is small.

FIG. 22 is a figure of an arrangement in which, in Working Example 18 of the present invention, a connecting rubber band 28 is provided on the back surface of a smartphone body 1 (and 100) having two back surfaces facing each other so that an arm 29 can pass in parallel with the short side, the arm is passed between the two smartphones and fixed to the wrist, so that the screen is facing the back side and palm side of the hand, respectively. When the screen 2 of the smartphone body 1 faces the back side of the hand, the screen 200 of the smartphone body 100 is arranged on the palm side, and the images and characters always face the inside of the mobile phone.

FIG. 23 is a cross-sectional view of an arm of FIG. 22 of Working Example 18 of the present invention as viewed from the shoulder direction. The connecting rubber band 28 is fixed to the back-surface side of the smartphones 1 and 100. The connecting rubber band 28 has a length that allows the arm (palm) to enter between the two smartphones and pass through, but can be installed near the wrist. The material of the rubber band 28 may be any elastic material such as natural rubber, or a metallic material such as a spring. According to Working Example 18 of the present invention, for example, an image of a smartphone screen can be seen when operating a keyboard or the like, and an image of a smartphone screen on the palm side can be seen even when holding an object. In addition, there is a unique effect wherein people facing each other can view smartphone images and take pictures on both screens by simply lifting their hands to the height of their faces.

FIG. 24 is a figure of Working Example 19 of the present invention, which is rotated about 90 degrees from FIG. 22 and attached. It is a figure in which connecting rubber band 28 is fixed to the back surface of the smartphone body 1 (and 100) with the back surfaces facing each other so that the arm 29 can pass in parallel with the long side, an arm is passed between the two smartphones and fixed to the wrist, and the screens are arranged so as to face the back side and the palm side of the hand, respectively.

FIG. 25 is a cross-sectional view of an arm of FIG. 24 of the 19th embodiment of the present invention as viewed from the shoulder direction. According to Working Example 19 of the present invention, the connecting rubber band 28 is fixed so that the arm 29 can pass in parallel with the long side, and since the product of the present invention is not much wider than the width of the wrist, it has the effect of not being hurt or getting in the way. Further, when taking a long and narrow vertical object in a photograph or a moving image, if the present invention is attached and the elbow is bent, the screen becomes vertically long in the vertical direction, which has an effect of being easy to take.

FIG. 26 is a figure showing the organic EL screen 20000 shown in FIG. 12 in Working Example 20 of the present invention, wherein a connecting rubber band 28 is fixed to the back surface of the smartphone body 1 (and 100) where the two back surfaces face each other so that the arm 29 can pass in parallel with the long side, the arm is passed between the two smartphones and fixed to the wrist.

The two smartphones make it possible to see the large screen integrally on the screen of the folding and bending portion 13000 of the organic EL.

FIG. 27 is a cross-sectional view of the arm of FIG. 26 of Working Example 20 of the present invention as viewed from the shoulder direction. According to Working Example 20 of the present invention, since the screen 13000 also exists in an integrated manner with the side surface of the wrist, there is an effect wherein, for example, images and characters can be seen even when the product of the present invention is viewed from the side, and the smartphone screen can be viewed even in the work of rotating and moving the hand.

FIG. 28 is a cross-sectional view of the arm in Working Example 21 of the present invention, viewed from the shoulder direction, with the present invention, formed of a flexible sheet that can fixate the portion that wraps around to the back surface of the organic EL screen 20000 of the smartphone body 1 to the wrist, attached to the arm.

According to Working Example 21 of the present invention, only the organic EL screen is used instead of the smartphone on the palm side, and the smartphone to be attached to the back side of the hand is also fixed to the wrist; therefore, it is lightweight and has the effect in which the screen is integrated so that images and the like can be enjoyed from either direction.

FIG. 29 is a cross-sectional view of the arm viewed from the shoulder direction in Working Example 22 of the present invention. The two superposed smartphones (1,100) are fixed by the holder 30 and attached to the arm 29 by the wristband 31.

(A) shows a figure in which a smartphone body 1 and a smartphone body 100 are connected by a hinge, and the side surface of the smartphone body 1 is fixed by a holder 30. This has the effect wherein the smartphone body 100 can be opened and closed while still attached to the arm 29.

(B) is a product of the present invention in which an organic EL20000 is used for the screen instead of a known liquid crystal, and the joint portion between the two smartphones 1 and 100 is an organic EL13000 so as not to bend at a sharp angle. As a result, there is an effect in which a large screen that integrates the screens of two smartphones can be viewed while being attached to the wrist.

The holder 30 may be made of metal or plastic; the wristband that may be of a structure that grips the entire side surface of the smartphone may be a rubber band for only the wrist, or may be a wristband having a structure that covers not only the wrist but also the palm and the back of the hand.

FIG. 30 is a figure wherein, in Working Example 23 of the present invention, the smartphones 1 and 100 are attached to fingerless gloves 32 provided with a holder 30, the fingerless gloves 32 are placed on the arm 29, the smartphone body 1 is opened at a right angle or more, the keyboard is displayed on the screen 200, and the characters typed on the screen 2 are displayed. As a result, while moving it is possible to input documents, use the Internet, and use it as a memo, which has the effect of enabling efficient work.

FIG. 31 is Working Example 24 of the present invention, which is similar to FIG. 30, but in (A), the two screens 2 and 200 are liquid crystal and a large screen is placed on the arm. In (B), the screen is an organic EL20000 and a large screen is placed on the arm. By expanding the organic EL, it is possible to see a seamless image.

FIG. 32 is a cross-sectional view of an arm in Working Example 25 of the present invention, in which a plurality of smartphones are attached to the arm and viewed from the shoulder direction.

(A) is a figure in which the smartphone body 1 is attached to the upper surface of the arm (direction of the back of the hand), and the smartphone body 100000 having a size capable of covering the side surface portion of the arm is attached to the side surface of the arm. The smartphone is connected by the hinge 13.

(B) is a view in which the smartphone body 1 is attached to the upper surface of the arm and the smartphone body 100000 is attached to the left and right-side surfaces of the arm.

(C) is a figure in which the smartphone body 1 is attached to the upper surface of the arm, the smartphone body 100000 is attached to one side surface of the arm, and the smartphone body 100 is also attached to the lower surface of the arm so as to sandwich the arm.

(D) is a figure in which the smartphone body 1 is attached to the upper surface of the arm, the smartphone body 100000 is attached to the left and right-side surfaces of the arm, and the smartphone body 100 is also attached to the lower surface of the arm so as to sandwich the arm. Only the smartphone body 1 on the upper surface of the arm is fixed to the arm. In the figures (A) and (B), the smartphone body 100000 is in contact with the side surface of the arm, can be rotated upward by the hinge 13, and can be opened horizontally with the smartphone body 1. Further, in (C) and (D), the smartphone body 100 connected to the smartphone body 100000 by the hinge 13 can also be opened on the same horizontal plane as the smartphone body 1.

The smartphone body 1 is fixed to the arm with a wristband only for the wrist, a wristband covering from the wrist to the fingertip, a connecting rubber band through which the arm can pass, or a wristband with a holder.

FIG. 33 shows a view when the folding smartphone of FIG. 32 of Working Example 25 of the present invention is attached to an arm and unfolded. The dotted line shows the time when the present invention of (A) to (D) of FIG. 32 is developed on the same horizontal plane as the smartphone body 1. According to Working Example 25 of the present invention, since the smartphone is wrapped around the arm, it saves space and does not get in the way, when expanded, the image can be viewed on a large screen, and the work can be performed on a plurality of screens, which are wonderful effects.

In FIG. 34, While cases of talking while looking at the other party's face are increasing, for example, when in a remote conference or a remote interview using a known smartphone, since the known smartphone camera 4 is provided on the upper part of the outer peripheral edge of the smartphone body 1 as shown in FIG. 34, when talking to the other party on the screen, the image seen by the other party is the image with the eyes 150 and 170 (black eyes) facing down or diagonally downward, as shown in FIG. 34, and the image of the dark image with the entire face facing down will be visible to the other party. On the contrary, when talking with the line of sight facing the camera 4, the other party can see the image with the line of sight facing the front, but since the camera is located above the screen 2, there is a drawback in that the other party's image cannot be seen.

FIG. 35 shows Working Example 26 of the present invention that eliminates this defect. Camera 4 is provided at the portion 14000 where the two smartphones (1, 100) are connected vertically or horizontally, and the camera is provided at the center of the entire drawing or at a position above it; the image of the other party can be seen in front of the line of sight, and at the same time, the image of the other party can be shown to the other party with the line of sight facing the front.

(A) is a view in which the camera 4 is provided in the center of the smartphone connecting portion 14000 that is vertically connected, and the smartphones 1, 100 are opened about 180 degrees so as to connect the faces vertically. Since the image is transmitted by the central camera 4, the image reflected on the other party is also an image with the line of sight directed to the front, and the line of sight of the other party can also be seen in front. The camera 4 mechanism is composed of an image sensor, a lens, ancillary semiconductor parts, and the like, but since the joint portion is rotatable, it is preferable to have a structure that is not easily broken even if the mechanism moves.

(B) is a view in which the camera 4 is provided above the center of the joint portion 14000 of the smartphones connected horizontally, and the smartphones 1 and 100 are opened about 180 degrees so as to connect the faces on the left and right. Further, since the camera 4 is provided with a camera in a portion above the center of the combined portion 14000, as a result, in (B), the line of sight of the eyes is directed to the front, so that the line of sight is directly in front of the image. This is very effective in interviews, etc., and has the wonderful effect wherein the video sent from the other party is very easy to see.

(C) is a diagram showing that the camera 4 is provided on the smartphone connecting portion 14000, and the smartphones 1 and 100 are placed on a desk or the like when opened by about 120 degrees so as to connect the faces on the left and right. This has the effect of enabling hands-free talk while watching the video without distracting the line of sight.

FIG. 36 is Working Example 27 of the present invention in which the invention of Working Example 26 is attached to an arm.

To attach it to the arm, the smartphone is inserted into an arm band, fingerless gloves, or the like provided with a smartphone holder (holder 30). There is an effect wherein, while moving, both hands are free and it is possible to talk with straight line of sight to the other party. As described above, the smartphone body 100 is fixed to the arm with a wristband only for the wrist, a wristband covering from the wrist to the fingertip, a connecting rubber band through which the arm can pass, or a wristband glove with a holder.

The orientation of attaching the smartphone to the arm may be such that the arm is parallel to the long side or at a right angle as shown in FIG. 26. When attached to the arm so as to be perpendicular to the arm, the camera 4 is provided above the center as shown in FIG. 35 (B), so that there is an advantage that the line of sight is directed straight to the other party.

With the above, a plurality of smartphones can be folded and attached to the arm, not only freeing both hands, but also since they are attached to your hand, it is not necessary to worry about carrying them, they are not bulky, they do not have to be placed in a pocket or bag, they do not have to be left behind, and images and the like can be enjoyed on a large screen anywhere.

In addition, by providing the camera position at the joint, it is easy to see the image from the other party, and the line of sight of the eyes comes in front, which has the effect of giving an impression.

EXPLANATION OF SYMBOLS

1 Smartphone body
10 Smartphone body
100 Smartphone body
1000 Smartphone body
10000 Smartphone body
100000 Smartphone body (attached to the side of the arm)
13 Smartphone combined hinge
130 Second hinge
1300 Third hinge
13000 Folding portion of organic EL
14000 Folding portion with camera
2 Smartphone screen
20 Smartphone screen
200 Smartphone screen
2000 Smartphone screen
20000 Organic EL screen
3 Camera shutter button
4 Camera
40 Camera
400 Camera
4000 Camera
5 Home button
6 Power button
7 Volume down button
8 Volume up button
9 Buzzer switch
10 Body
11 Charging contact
12 Camera and microphone
120 Camera and microphone
13 Hinge 131 First hinge
132 Second hinge
133 Arm connecting the first hinge and the second hinge
130 Hinge
1300 Hinge
13000 Organic EL hinge and screen
14 Left and right lenses
15 Eyes
150 Partner's eyes on the screen
16 Left and right lenses
17 Eyes
170 Partner's eyes on the screen
18 Screen
19 Screen
21 Speaker
210 Speaker
22 Sound from the speaker
220 Sound from the speaker
21 Self (FIG. 7)
22 Partner (FIG. 7)
23 3D device
24 Separator
25 Hinge
26 Protective cap
260 Protective cap
27 Knob cap
28 Connecting rubber band
29 Arms
30 Holder
31 Wristband
32 Fingerless gloves

The invention claimed is:

1. A smartphone system comprising:
a dual-connected smartphone with a screen and cameras provided at left and right ends of a back of a main smartphone body, the main smartphone body including a first smartphone body and a second smartphone body connected to each other;
a first speaker provided at the left end of the back of the first smartphone body, and a second speaker provided at the right end of the back of the connected second smartphone body; and
a three-dimensional device including a separator portion and left and right lenses portions for viewing separate left and right images captured by the cameras, the separator portion extending perpendicular to and through a center portion supporting the left and right lens portions and separating a left lens and a right lens of the left and right lens portion, the three-dimensional device being separate from the dual-connected smartphone,
wherein the three-dimensional device freely stands on a floor surface in front of the dual-connected smartphone by opening the separator portion and the left and right lens portions in a fan shape, in the fan shape the separator portion extending through the center portion along and in contact with the floor surface into an area in front of and an area in back of the left and right lens portions, and displays the left and right images in the left and right lens portions captured by the cameras.

2. The smartphone system according to claim 1, further comprising
a hinge portion that includes a first hinge connected to the first smartphone body and a second hinge connected to the second smartphone body, and
the first hinge and the second hinge have a mechanism connected by an arm.

3. The super smartphone system according to claim 2, wherein the hinge portion functions to fix the first smartphone body and the second smartphone body in an expanded position.

4. The super smartphone system according to claim 2, wherein the hinge portion is configured to stop at arbitrary angles.

5. The super smartphone system according to claim 2, wherein a plurality of smartphones is attached to the arm by connecting them with arm attachments such as belts or springs.

* * * * *